(12) United States Patent
Chen (10) Patent No.: US 7,081,883 B2
(45) Date of Patent: Jul. 25, 2006

(54) LOW-PROFILE MULTI-CHANNEL INPUT DEVICE

(76) Inventor: Michael Changcheng Chen, 25F Paterson Road, Singapore (SG) 238515

( * ) Notice: Subject to any disclaimer, the term of this patent is extended or adjusted under 35 U.S.C. 154(b) by 213 days.

(21) Appl. No.: 10/144,383

(22) Filed: May 14, 2002

(65) Prior Publication Data

US 2003/0214482 A1   Nov. 20, 2003

(51) Int. Cl.
G09G 5/08 (2006.01)
(52) U.S. Cl. ............. 345/163; 345/167; 345/156
(58) Field of Classification Search ......... 345/161, 345/163–167, 156–158, 168, 173; 341/20, 341/27, 22
See application file for complete search history.

(56) References Cited

U.S. PATENT DOCUMENTS

| | | | | | |
|---|---|---|---|---|---|
| 5,012,230 | A | * | 4/1991 | Yasuda | 345/160 |
| 5,086,296 | A | * | 2/1992 | Clark | 345/157 |
| 5,296,871 | A | * | 3/1994 | Paley | 345/163 |
| 5,638,062 | A | * | 6/1997 | McAlindon | 341/20 |
| 5,798,748 | A | * | 8/1998 | Hilton et al. | 345/156 |
| 5,841,423 | A | * | 11/1998 | Carroll et al. | 345/168 |
| 5,923,318 | A | * | 7/1999 | Zhai et al. | 345/157 |
| 5,956,016 | A | * | 9/1999 | Kuenzner et al. | 345/156 |
| 6,129,318 | A | * | 10/2000 | Paulse | 248/118.3 |
| 6,259,382 | B1 | * | 7/2001 | Rosenberg | 341/20 |
| 6,300,938 | B1 | * | 10/2001 | Culver | 345/156 |
| 6,417,837 | B1 | * | 7/2002 | Baba | 345/157 |
| 6,441,753 | B1 | * | 8/2002 | Montgomery | 341/34 |
| 6,727,889 | B1 | * | 4/2004 | Shaw | 345/163 |
| 6,750,845 | B1 | * | 6/2004 | Hopper | 345/156 |
| 2002/0075233 | A1 | * | 6/2002 | White et al. | 345/161 |
| 2003/0011565 | A1 | * | 1/2003 | Chan | 345/156 |

* cited by examiner

Primary Examiner—Xiao Wu (57) ABSTRACT

A high-performance, compact, finger-operated pointing device comprises a body (34), a base (32), and return members (48). The body has integrated input elements (52). Finger-engaging elements (26) allow operating fingers to move the body and manipulate the integrated input elements simultaneously. Sensors (38) translate the body's movement to positional control signals to control positions of a computer controlled target. As an isometric device, the magnitude of the positional control signals is mapped to the moving speed of the target.

21 Claims, 10 Drawing Sheets (Prior Art)

LOW-PROFILE MULTI-CHANNEL INPUT DEVICE

BACKGROUND

1. Field of Invention

The present invention relates to electrical input devices for computer systems, specifically to an improvement to existing pointing devices such as mice and pointing sticks.

2. Description of Prior Art

Pointing devices, such as mice and pointing sticks, are widely used with modem computer systems. Pointing devices translate input from an operator into electrical control signals. An input can be in many forms. It can be, for example, the distance of a movement, or the strength of an applied force, or the duration of an event, etc. Regarding the output signals, pointing devices are used for producing two types of control signals for computer systems, namely, "positional signals" and "non-positional signals". Positional signals are used to control positions or displacements of a computer-controlled target, such as a cursor or a robot. Non-positional signals are used to select, or to change properties of, the computer-controlled target.

Figure 1:
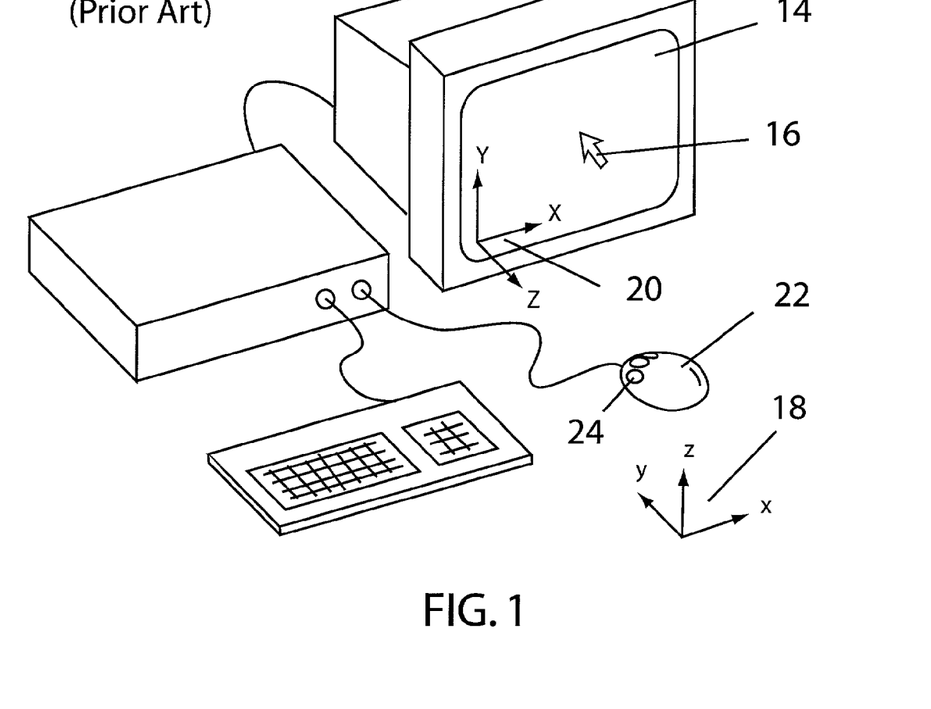
FIG. 1. shows a prior-art computer system running a GUI (graphical user interface) application, with a mouse used as a pointing device.

FIG. 1 shows a prior-art computer system using a mouse 22 as a pointing device. Moving the mouse produces positional signals. These signals are used to control the position of a cursor 16 on a screen 14. On the other hand, clicking buttons 24 produces non-positional signals, and these signals are used for tasks such as the selection of a menu item.

A coordinate system 18, with axes marked by lower-case letters x, y, and z, is referred to as the "input space". Another coordinate system 20, with axes marked by upper-case letters X, Y, and Z, is referred to as the "output space". Pointing devices (e.g., mouse 22) are operated in the input space (e.g., the space near mouse 22), while targets (e.g., cursor 16) are moved in the output space (e.g., screen 14). For one aspect, the mouse acts as a proxy for the cursor. That is, the mouse's movements in input space 18 are mapped into movements of the cursor in output space 20. When a target's 3D movements are limited by a 2D display device such as the screen, the Z-axis movement may be virtually represented as "zoom in" or "zoom out" of the target's image on the screen.

When a pointing device is positioning a target, a maximum of six degrees of freedom (DOF) can be controlled by the positional control signals. Three of them are translational movements on the x, y, and z axes, which represents a target's position change projected onto these axes. The others are rotational movements about the x, y, and z axes, which control a target's orientation with respect to these axes. Each DOF requires an independent control signal channel from the pointing device. The information contained in the signals from each channel, such as their magnitude, reflects the amplitude of the user input, such as the distance a mouse has been moved or the pressure that has been exerted on a pointing stick by pushing it.

With regard to mapping a channel of positional signals to a target's movement in one DOF, pointing devices can be classified into "isometric" and "isotonic" devices. An isotonic pointing device maps the magnitude of the signals to the distance of a target's movement. An isometric pointing device, on the other hand, maps the magnitude of the signals to the speed with which a target moves. These mappings may not necessarily be linear. A conventional mouse is an example of an isotonic pointing device. A conventional pointing stick is an example of an isometric pointing device.

Mice are well known pointing devices. Operating a mouse requires a relatively large and flat working space. This requirement renders mice unsuitable for portable computers. Also, when moving a cursor over a long distance on the screen, one often needs to lift and reposition the mouse body repeatedly. This problem is sometimes referred to as "clutching".

Pointing sticks are also commonly seen pointing devices. Compared to mice, pointing sticks are isometric pointing devices. They are mounted on fixed bases and require less working space to operate. Also, pointing sticks do not suffer from the clutching problem. For these reasons, they can be used in portable computers.

However, pointing sticks can be difficult to use. A pointing stick employs a miniaturized stick operated by a finger. The tip of the stick is generally tiny and thus difficult to contact and move by the operating finger. Also, the stick cannot provide proper rest support to the finger. Moreover, because of its small size, a pointing stick cannot be integrated with buttons. To produce non-positional signals, a pointing stick requires additional buttons in a different location. This means that fingers have to be moved forth and back in order to perform "point and click" operations.

A device disclosed in U.S. Pat. No. 6,121,954 to Seffernick, 2000, is an improved isometric pointing device. The device has an integrated z-axis sensor, which detects the movement of a finger-operated element along the z axis and produces corresponding signals. Seffemick claims that the signal produced by the z-axis sensor can be used to simulate button-clicks, so the devices can perform "point and click" simultaneously. However, because there is only one movable element to interact with the z-axis sensor, the device can only simulate a single button. In other words, it cannot be used for an application that needs multiple-button inputs (e.g. "left click", "right click", etc.).

U.S Pat. No. 6,326,948 to Kobachi, et al., 2001, describes another device integrated with a z-axis sensor. It suggests that signals produced by the z-axis sensor can be used to control a target's movement along the axis. One shortcoming of this approach is that the sensor will only respond to a finger's downward "push", but not the finger's upward "lift". Hence, an operator can only move a target in one direction along the Z axis.

Another isometric input device, disclosed in U.S. Pat. No. 6,246,391 to Ong, 2001, employs a dangling ball connected to a frame via elastic springs. An operator twists and moves the ball from the input space to control a cursor's movement in the output space. One shortcoming of the device is its large size. It also requires a large amount of space to operate. As a result, the device cannot be integrated into portable computers. Ong suggests that buttons be integrated into the ball so the operator can "point and click" at the same time. However, the operator has to grasp the ball by using some fingers and click on the buttons by using some other fingers. In other words, the device cannot do both "point and click" using the same fingers, and is therefore less effective. Moreover, ergonomic factors, such as providing rest support to the operating fingers, are not well addressed in these devices.

Yet another input device, disclosed in U.S. patent application publication 2002/0,039,093 to Healey, published Apr. 4, 2002, allows a user to operate on a "control member" using fingers. The control member is basically a mouse mounted on top of a pointing stick. Similar to the Ong device above, it is difficult to move the control member by solely using the button-clicking fingers. This is due to lack of proper finger-engaging constructs. Also, the device is limited to providing positional control signals for two DOFs only.

Lastly, normal pointing devices, like mice or pointing sticks, provide only positional controls of the target over two DOFs. Devices offering control of a target for more than two DOFs, such as the one disclosed in U.S. Pat. No. 4,811,608 to Hilton, 1989, are complex and expensive to build. Many of them are awkward to use.

Objects and Advantages

Accordingly, several objects and advantages of the invention are:

to provide a pointing device of compact size that requires minimal space to operate and can be operated by using fingers of a hand only, which renders it suitable for use with portable computers;

to provide a pointing device that can be integrated with buttons; the device therefore can produce both positional and non-positional signals;

to provide a pointing device that is able to control a target's position in an output space over a maximum of six degrees of freedom; and to provide an ergonomic pointing device that provides proper feedback and rest support to the operator's fingers.

Other objects and advantages are:

to provide a device which uses existing technologies and off-the-shelf components, so that manufacturing the device is less expensive; and to provide a device that can be integrated with many types of input elements, including buttons, wheels, pressure sensors, tablets, miniaturized pointing sticks, miniaturized track balls, etc, whereby the device is suited to a wide range of applications.

Further objects and advantages will become apparent from a consideration of the drawings and ensuing description.

SUMMARY

The present invention is a pointing device which can be integrated into portable computers, or be used alone in space-constrained situations. It produces both positional and non-positional signals. It has a small size, and offers high performance and ergonomic features.

One preferred embodiment has a body and a base. The body can be moved by finger force input horizontally with respect to the base. Returning members return the body to a neutral position when the finger force is removed. Sensors detect the body's displacement and generate positional control signals. As an isometric pointing device, these signals are preferably intended to be used to control the speed and direction of a computer-controlled target.

Input elements such as buttons may be integrated into the body. As a result, the device is self-contained and can produce both positional and non-positional signals. Finger-engaging elements permit the same fingers to be used for moving the body and for operating the input elements. It is thus very efficient at "pointing and clicking" simultaneously, without moving or switching fingers back and forth. It also frees other fingers from being occupied in the operation, so they can be used to support the hand or to perform additional input tasks.

The body has a large top surface to accommodate the operating fingers. This makes the device easy to control. The large top surface also provides a rest support for the operating fingers. Moreover, when the fingers are moving the body, the returning members provide proper feedback to the operating fingers. These ergonomic features improve operational comfort and help to deliver optimal performance.

| Reference Numerals In Drawings | |
|---|---|
| 14 | screen |
| 16 | cursor |
| 18 | input space |
| 20 | output space |
| 22 | mouse |
| 24 | mouse button |
| 26 | button cap |
| 28 | dimple |
| 30 | gap |
| 32 | base |
| 34 | body |
| 36 | output cable |
| 38 | pressure sensors |
| 40 | inner wall of base |
| 42 | side surface of body |
| 44 | rubber skirt |
| 46 | PCB |
| 48 | coil springs |
| 50 | support bearings |
| 52 | button |
| 56 | rheostat |
| 58 | hole |
| 60 | shaft |
| 61 | small hole on body |
| 62 | stopper |
| 64 | bottom of body |
| 66 | floor of base |

-continued

| | Reference Numerals In Drawings |
|---|---|
| 68 | well |
| 70 | hand |
| 72 | dimple slope |
| 74 | finger |
| 76 | rubber layer |
| 78 | distance between rubber layer and button |
| 80 | coil springs |
| 82 | tablets |
| 84 | holes |
| 94 | wheel |
| 96 | track ball |
| 98 | rotary encoder |

DETAILED DESCRIPTION

Figure 2:
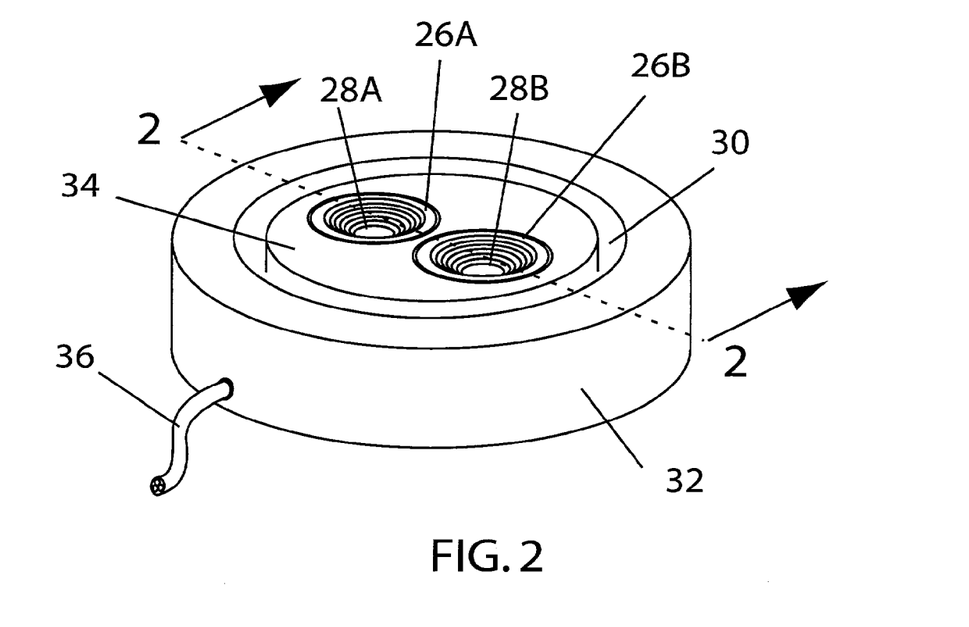
FIG. 2. shows a perspective view of a first preferred embodiment of a pointing device according to the invention.
Figure 3:
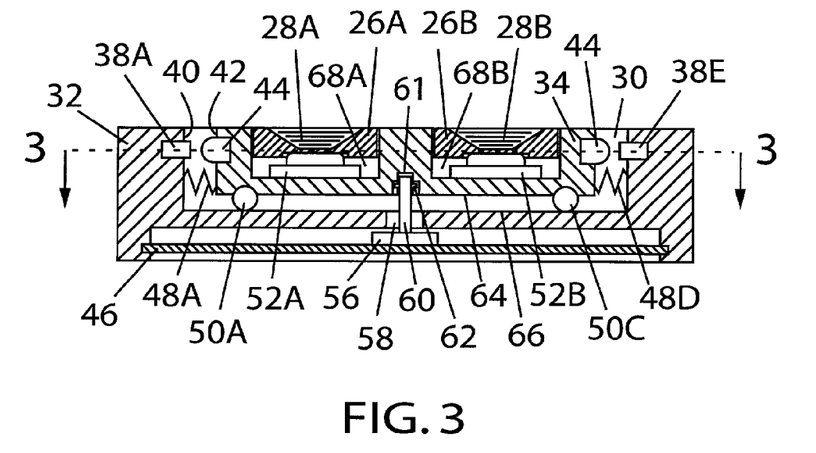
FIG. 3. shows a cross-sectional view, from line 2—2 in FIG. 2, of the first preferred embodiment.
Figure 4:
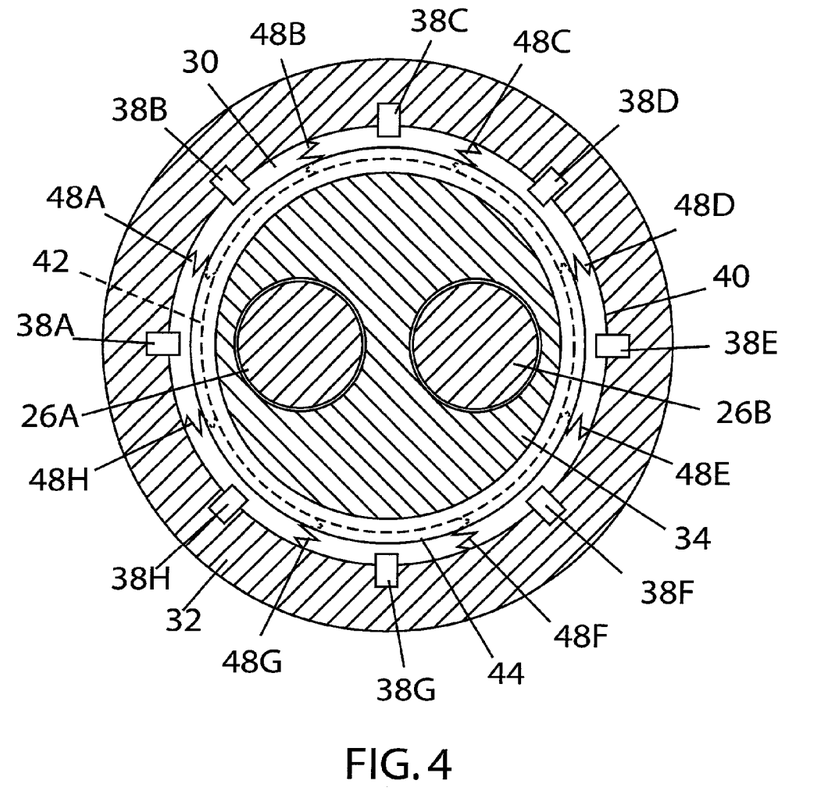
FIG. 4. shows a cross-sectional view, from line 3—3 in FIG. 3, of the first preferred embodiment.

FIGS. 2–4—First Preferred Embodiment

FIG. 2 shows a first preferred embodiment comprising a disc or a movable body 34, situated in a housing or a base 32. A gap 30 between body 34 and base 32 allows body 34 to move horizontally within base 32 over a small distance. Two finger-engaging elements or button caps 26 are shown at the top surface of body 34. Each button cap 26 has a dimple 28 at its top. Each dimple accommodates one operating finger. The ribbed surface of the dimples increases friction. An output cable 36 connects the device to a computer processing unit (not shown).

FIG. 3 shows return members or coil springs 48, which connect body 34 to base 32. Support bearings or balls 50 support body 34 on a floor 66 of base 32. Balls 50 reduce friction between body 34 and base 32 when the body is moving horizontally.

A rubber skirt 44 or an elastic ring surrounds a side surface 42 of body 34. Pressure sensors 38 or force-sensitive resistors are attached on an inner wall 40 of base 32, opposite the rubber skirt across gap 30. Two wells 68 in body 34 open to the top surface of body. Each well contains an input element or a button 52. Buttons 52 in wells 68 are covered by button caps 26.

A printed circuit board (PCB) 46 is mounted at the bottom of base 32. A rotation sensor or a rheostat 56 is soldered onto the PCB. Rheostat 56 has an elastic shaft or a stick 60. Twist or rotation of shaft 60 adjusts the resistance of rheostat 56. PCB 46 also contains signal-processing circuits (not shown), which are responsible to collect and process signals from pressure sensors 38, rheostat 56, and buttons 52.

Through a hole 58 on floor 66 of the base, the shaft is plugged into a small hole 61 at the bottom of body 34. The shaft is loosely coupled to the body—that is, the shaft can slide vertically within small hole 61 when necessary. Because of this and because the shaft is elastic and bendable, it does not stop the body from moving horizontally. A stop 62 at the top of the shaft allows the rotation of body 34 to be transferred to and adjust rheostat 56.

FIG. 4 shows eight pressure sensors 38 evenly distributed around the circle of inner wall 40 of base 32. Eight coil springs 48 connect body 34 to base 32, across gap 30. The elastic coil springs allow body 34 to be moved (translated and rotated relative to base 32). When the body is moved by external force, springs 48 expand or compress accordingly. The springs thus produce a returning force that acts on the body—attempting to return the body to a neutral position.

Figure 5:
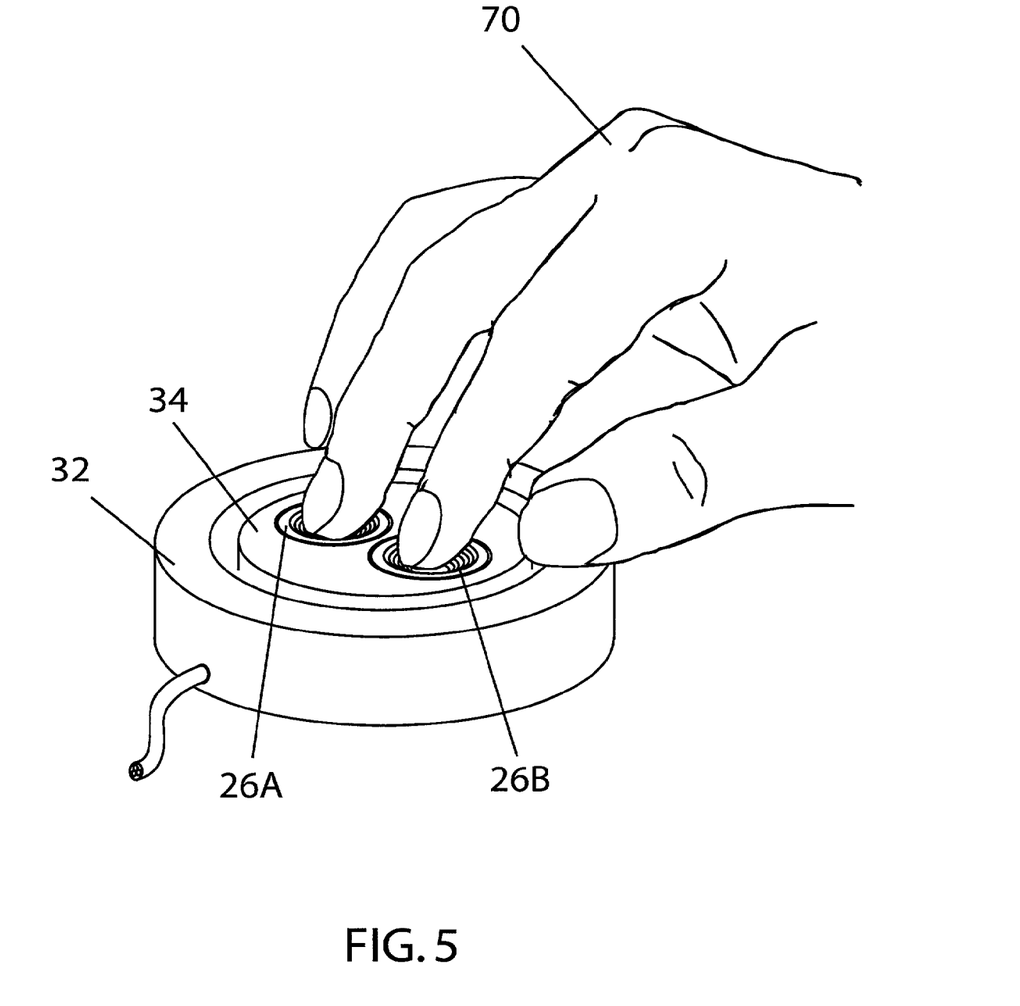
FIG. 5. shows a perspective view of a hand operating the first embodiment of the invention.
Figure 6A:
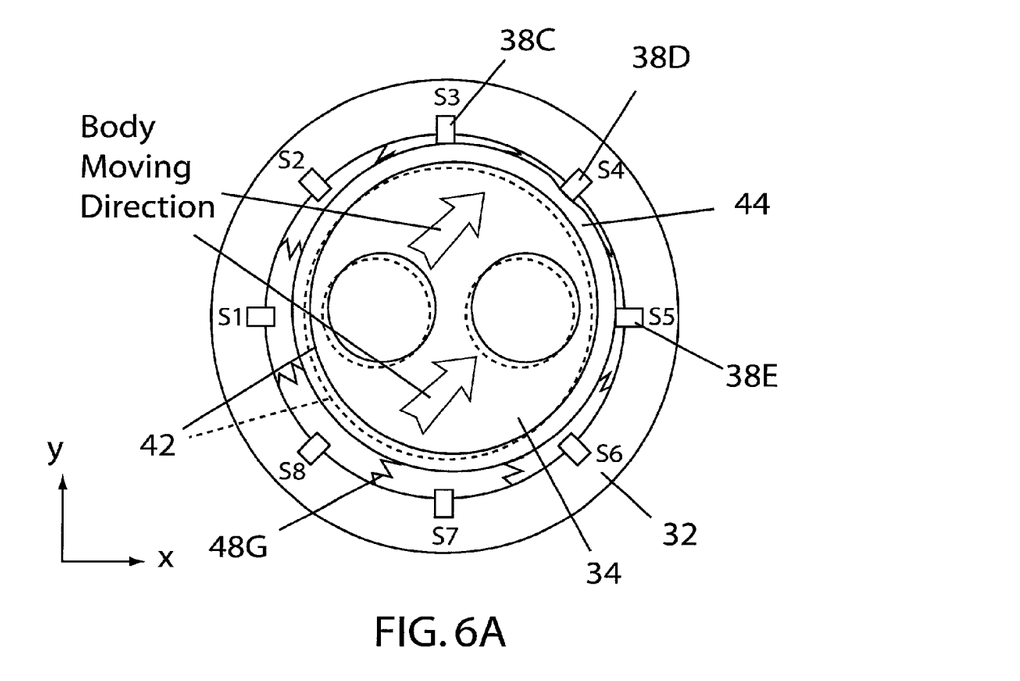
FIG. 6A–6B are illustrative diagrams of examples of body positions, during operations of the first embodiment.
Figure 6B:
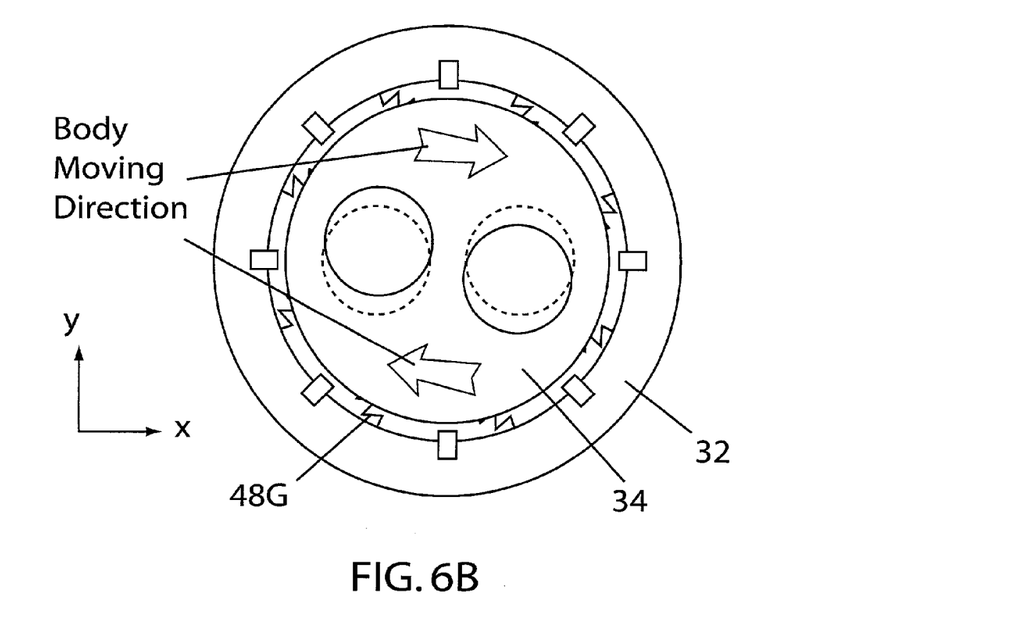

FIGS. 5–6—Operation of First Preferred Embodiment

FIG. 5 shows the operation of the first preferred embodiment. In FIG. 5, an operator's hand 70 is in its natural resting position. The thumb and the ring finger of the hand rest on base 32, and provide stability and support. The index finger and the middle finger apply horizontal forces via button caps 26 in order to move the body. Alternatively, one may use the index finger and the ring finger to operate on the button caps, and place the middle finger between the two caps on the body. In this case, the middle finger can help to move the body, even though it is not necessary.

The movements of the body can be translational and/or rotational. FIG. 6A indicates a translational movement of body 34 in an oblique direction. The body movement causes rubber skirt 44 to exert pressure on pressure sensors 38. In FIG. 6A, first pressure sensor 38D is heavily pressed by the rubber skirt, while second sensor 38C and third sensor 38E are only slightly touched by the rubber skirt.

The magnitude and direction of the input force are thus reflected by the body movement, and are further reflected by the signals produced by the sensors in each direction. By measuring output signals produced by each sensor, the magnitude of the positional signals for movement along the x and y axes can be calculated. Equations (1) and (2) are an example of such a calculation:

$$C1 * M.x = (-1)*(S1) + (-0.7)*(S2+S8) + 0*(S3+S7) + 0.7*(S4+S6) + 1*(S5) \quad (1)$$

$$C1 * M.y = (-1)*(S7) + (-0.7)*(S6+S8) + 0*(S1+S5) + 0.7*(S4+S2) + 1*(S3) \quad (2)$$

where M.x and M.y are the magnitude of the positional signals along the x-axis and the y-axis. C1 is a predefined constant. S1 to S8 are the effective signals from each of the pressure sensors 38. "Effective" means that the signals result from the rubber skirt exerting pressure on the sensors. These signals can relate to the applied force. They can also relate to, for example, the duration of the pressure applied on the sensors.

FIG. 6B indicates a clockwise rotation of the body resulting from torque applied by the fingers, while FIG. 3 shows that the rotation of body 34 adjusts rheostat 56 through shaft 60. The magnitude of the rotational input M.z can be calculated using resistance measurements and equation (3):

$$C2*M.z = R2 - R1 \quad (3)$$

where R1 and R2 are the resistance values of the rheostat before and after the body is moved. C2 is another predefined constant.

Signals from the pressure sensors and the rheostat are collected and processed by signal-processing circuits on PCB 46. These circuits process the collected signals according to the logics from equations (1), (2), and (3), and output three channels of control signals reflecting M.x, M.y, and M.z. These control signals can be used to drive the movements of a computer-controlled target. As the embodiment is an isometric pointing device, these signals are preferably mapped to the target's speed in the direction of the X, Y, and Z axes in the output space. Circuits which implement logics of equations (1), (2), and (3) are conventional and well known to those skilled in the art.

Note that the output signals of M.x, M.y, and M.z can each be either positive or negative. This is necessary to control a target's movement in both directions along the X, Y, and Z axes. In the device disclosed in the Kobachi, et al., patent above, an integrated z-axis sensor responds only to downward finger pressure, but not to upward finger lift. Therefore, such a device is incapable of bi-directionally controlling a target's movement along the Z axis. The first embodiment of my device solves this problem by utilizing the clockwise and anti-clockwise body rotations to control a target's bidirectional movement along the Z axis. The downward pressure of the fingers is used to manipulate the integrated buttons.

Figure 7A:
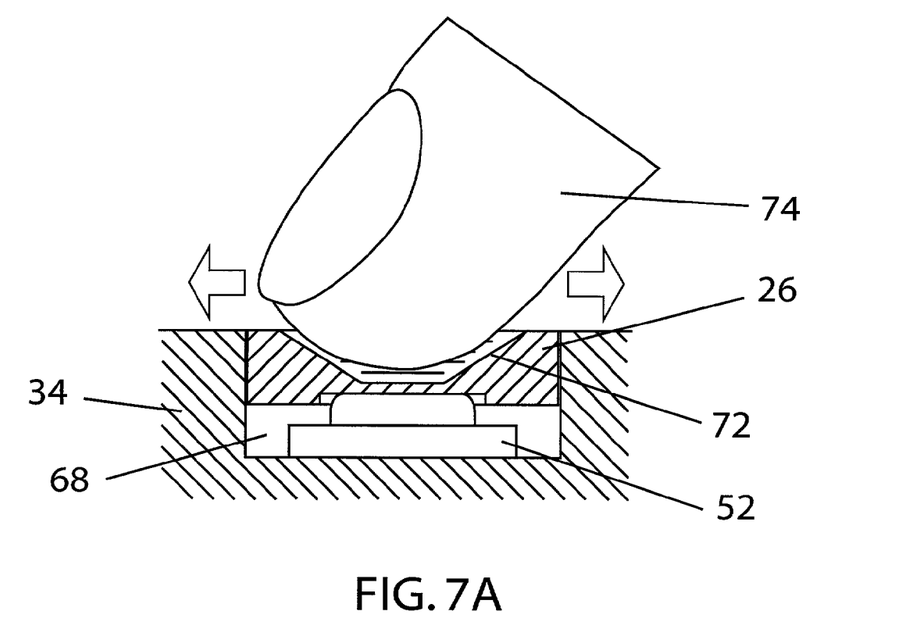
FIG. 7A–7C show cross-sectional views (enlarged) of finger engagement structures that can be employed in the pointing device according to the invention.
Figure 7B:
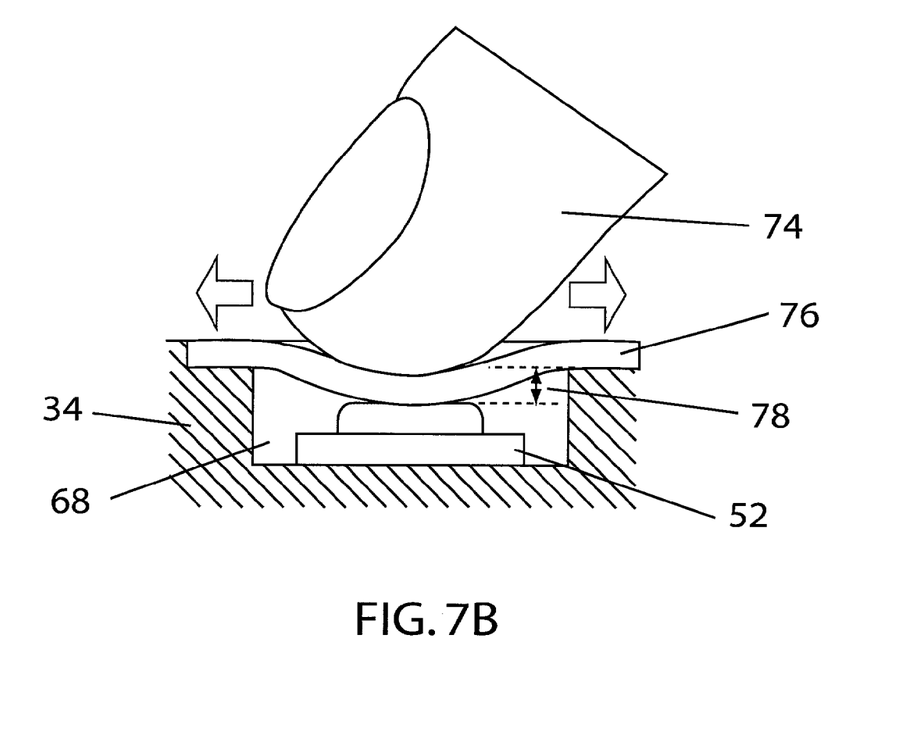
Figure 7C:
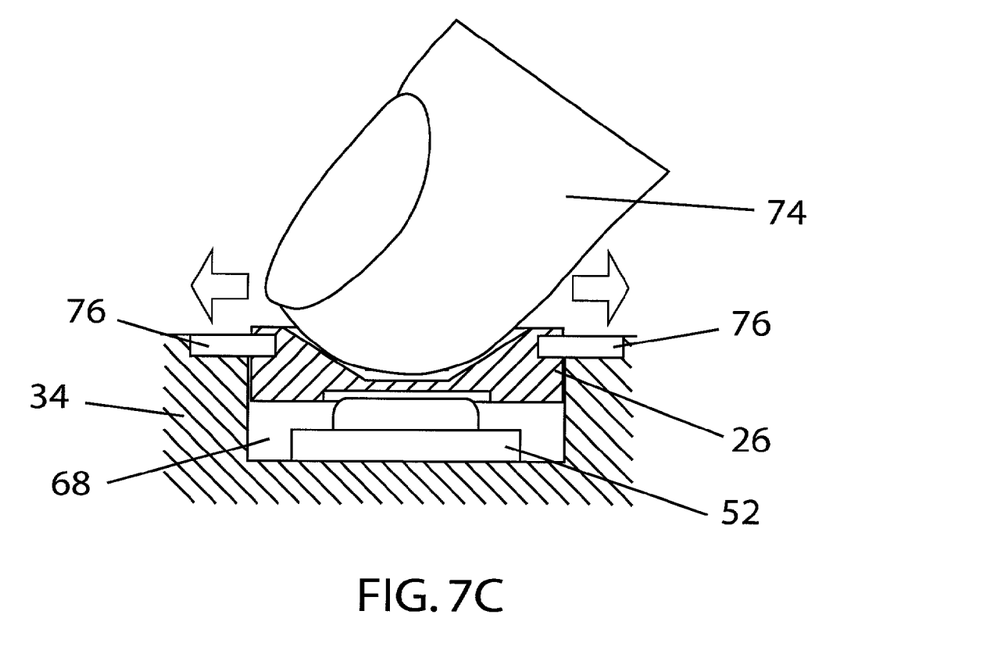

FIGS. 7A–7C—Button Integration and Finger-engaging Elements

By manipulating the integrated buttons, the first embodiment responds to non-positional inputs (i.e. button clicks) in addition to the positional control commands described above. The finger-engaging elements allow the same operating fingers to move the body and click on the buttons simultaneously.

FIG. 7A illustrates how a finger 74 engages button cap 26. Cap 26 has a dimple structure at its top. A slope 72 on the dimple allows the finger to apply horizontal forces to the body without too much downward pressure. The non-slippery ribs on the slope also help in coupling the button cap to the finger. At the same time, the button cap can move vertically within well 68. This allows the finger to press the button cap downwards and click on button 52. In addition, the button has a preset triggering threshold, such that it will not mistakenly respond to small amounts of downward pressure.

FIG. 7B shows another finger-engaging element that permits the operating finger to "point and click" simultaneously. Here, the finger-engaging element is a layer of soft non-slippery rubber 76. The rubber layer covers the top of well 68 containing button 52. By pressing slightly on the rubber layer, finger 74 is coupled to the body and can move the body horizontally. A small distance 78 between rubber layer 76 and button 52 prevents the button from being mistakenly triggered. When it is intended, the rubber layer can be pressed further in order to trigger the button. Again, a triggering threshold can be set, so the button does not respond to small amounts of pressure applied to it.

FIG. 7C shows another finger-engaging element that combines cap 26 with rubber layer 76. The elastic rubber layer increases the threshold of triggering the button, and helps to transfer horizontal finger-force to body 34. The pointing and clicking functions are therefore more effective and reliable.

For the purpose of simultaneously moving the body horizontally and clicking the buttons vertically, button caps and rubber layers are just three examples of finger-engaging elements among many others. These examples assume use of off-the-shelf buttons 52 without modification. It is however possible to specially design buttons for such purposes. For example, a button cap can be made as part of a button.

As described above, the first preferred embodiment is operated by fingers of a hand; it responds to input force to provide positional control signals over three degrees of freedom; it also features integrated buttons to produce non-positional signals; button caps and other finger-engaging elements allow operating fingers to perform both "point and click" operations simultaneously.

FIGS. 8–11—Description of Second Preferred Embodiment

Figure 8:
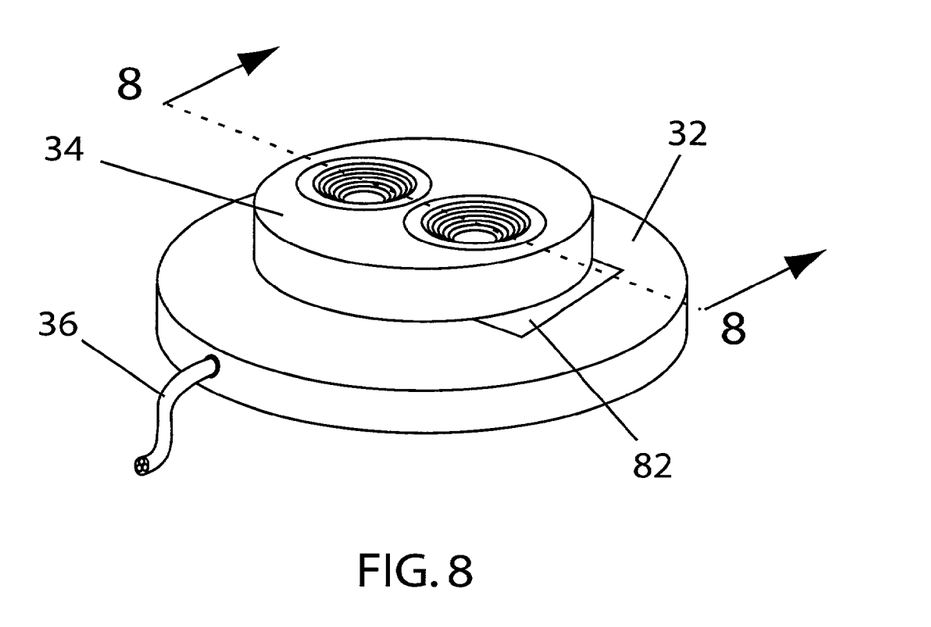
FIG. 8. shows a perspective view of a second preferred embodiment.

FIG. 8 shows a second preferred embodiment with body 34 similar to the one in the first embodiment. Flat base 32 allows the body to slide on its top. Tablets 82 are used to sense the body's movement. Tablets are sensing devices which can locate a stylus' position by sensing the point of pressure applied by the stylus. Tablets are well known to those skilled in the art.

Figure 9:
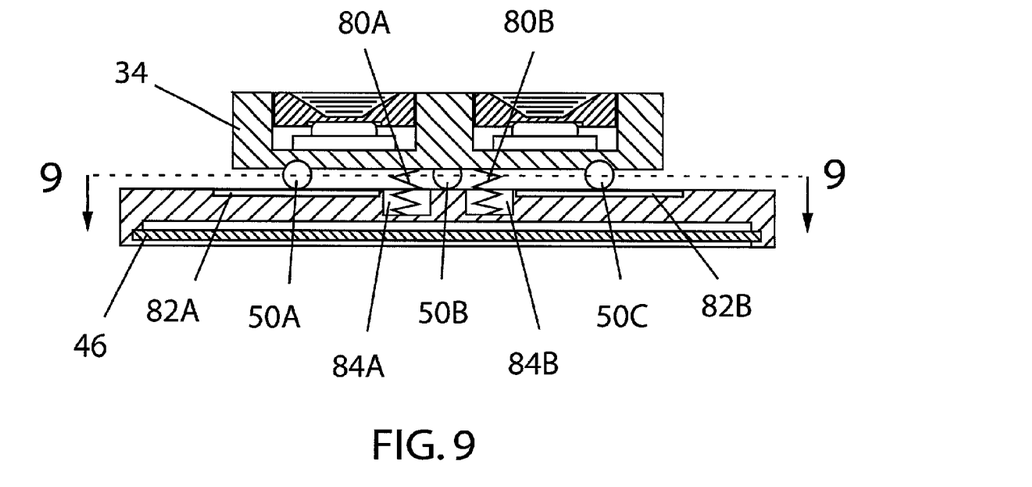
FIG. 9. shows a cross-sectional view, from line 8—8 in FIG. 8, of the second preferred embodiment.

FIG. 9 shows a cross-sectional view of the second preferred embodiment. Compared to the body of the first embodiment in FIG. 3, the body structure of this embodiment is largely the same. However, this embodiment does not use the surrounding pressure sensors for sensing the body's translational movement. The rheostat and the associated shaft are also removed. Instead, the second embodiment employs two tablet sensors 82 for sensing both translational and rotational movements of the body. Similar to the first preferred embodiment, PCB 46 contains processing circuits which collect and process generated signals from the sensors.

As is also shown in FIG. 9, returning members or coil springs 80 are situated in holes 84. They connect the bottom of body 34 to the top of the base. Support bearings or balls 50 reduce the friction between the body and the base. Two balls, 50A and 50C, also function as styli for each of the tablets and are referred to as "stylus balls".

Figure 10:
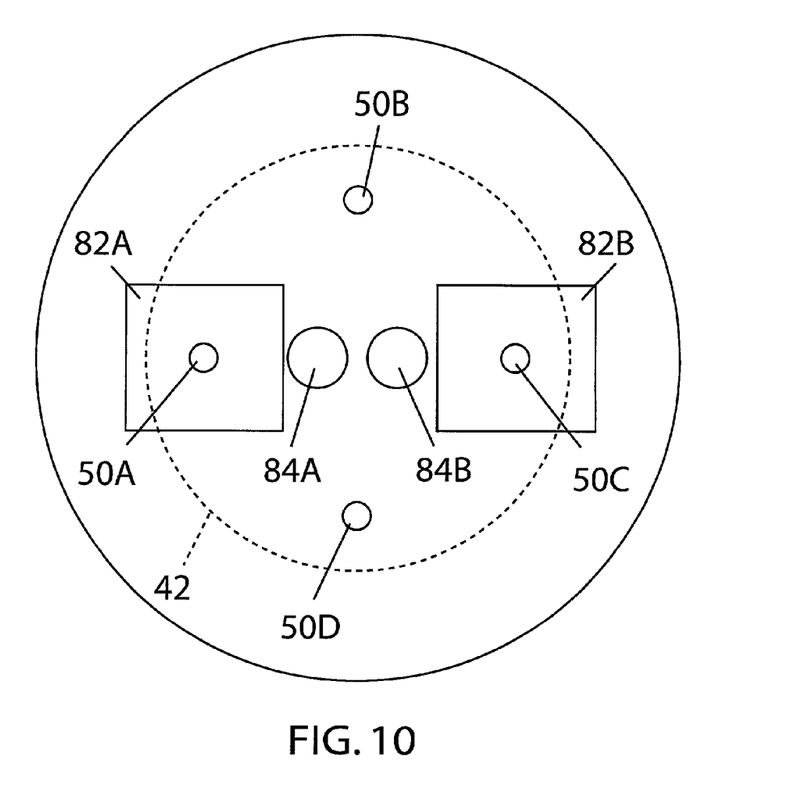
FIG. 10. shows a cross-sectional view, from line 9—9 in FIG. 9, of the second embodiment.

FIG. 10 shows balls 50 are evenly placed under body 34. It shows that when there is no external force applied and the body is in a neutral position, the two stylus balls are roughly at the center of each tablet.

Figure 11A:
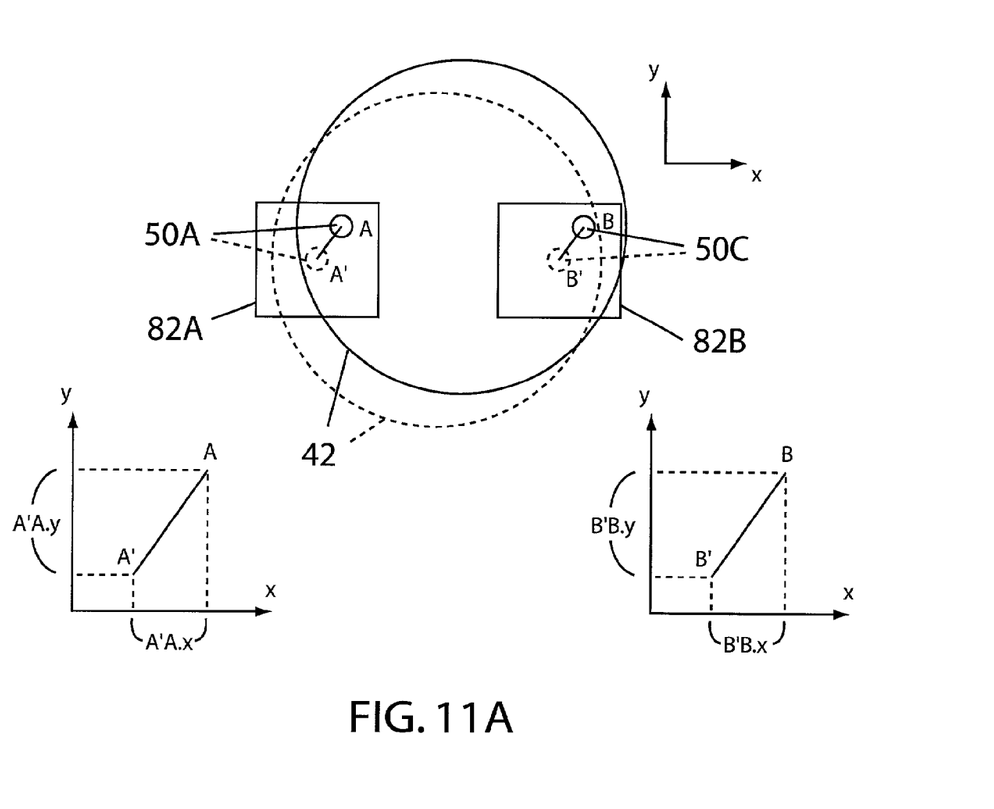
FIG. 11A–11B show sensing tracks on tablets resulting from a body's position change, during the operation of the second embodiment.

FIG. 11A shows the body after it has been shifted in a translational movement from a first position to a second position. Correspondingly, stylus balls 50A and 50C move from positions A' and B' to positions A and B, as recorded by tablets 82.

As shown in the two enlarged diagrams of FIG. 11A, first tablet 82A records the displacement of first ball 50A as track A'A. Similarly for second tablet 82B, the recorded displacement of second ball 50C is track B'B. The magnitude of positional control signals in the x-y plane can be calculated. One example of such calculation is demonstrated in equations (4) and (5) below:

$$C3 * M.x = A'A.x + B'B.x \quad (4)$$

$$C3 * M.y = A'A.y + B'B.y \quad (5)$$

where M.x and M.y are the magnitude of the control signals generated along the x-axis and y-axis. A'A.x and B'B.x are projections of tracks AA' and BB' on the x axis, and A'A.y and B'B.y are projections of tracks AA' and BB' on the y axis. C3 is a predefined constant.

Figure 11B:
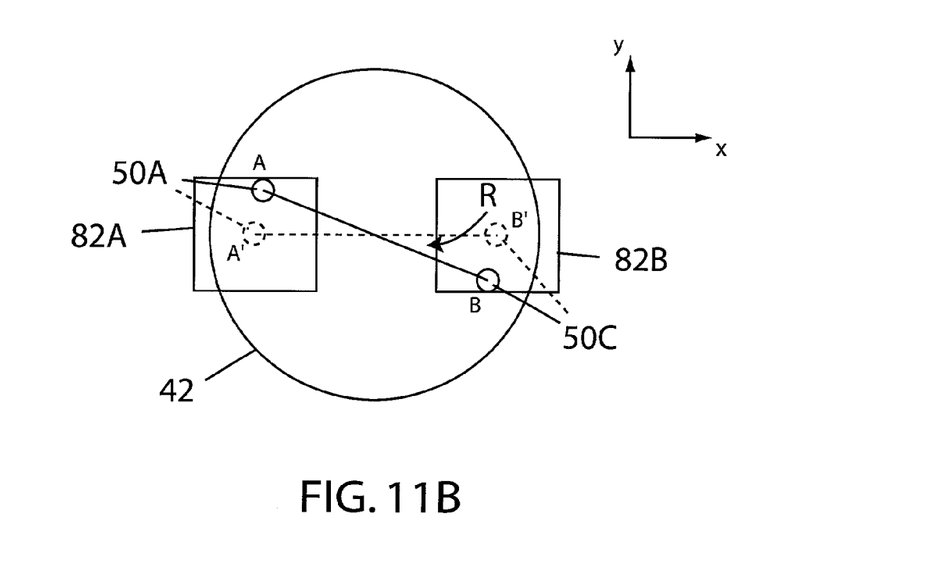

FIG. 11B shows the body after it has been rotated clockwise. One stylus ball 50A is moved from position A' to position A. Another stylus ball 50C is moved from position B' to position B. Equation (6) calculates the magnitude of the control signal M.z generated as a result of the body's rotation about the z-axis:

$$C4 * M.z = R$$

where R is the angle between the lines A'B' and AB, and C4 is another predefined constant.

Conventionally, tablets are only used as sensing elements for isotonic pointing devices. The second preferred embodiment demonstrates a novel method of using a tablet as sensing element in an isometric pointing device. That is, a tablet is used to measure the difference between the shifted position of a body and a pre-established reference position, and the magnitude of the control signal reflects the measured difference. As an isometric pointing device, the magnitude of the input is mapped to the speed of a target in the output space.

Note that in the second embodiment, it is possible to use only one tablet to sense both stylus balls. For example, one can use techniques described in U.S. Pat. No. 5,825,352 to Bisset, et al., 1998, which achieve the detection of the positions of multiple fingers on a single tablet.

Also note that instead of using stylus balls and tablets, one can also use light-emitting elements operating on an array of light sensors to detect a body movement. Other motion detecting techniques, such as pattern detection, generation of magneto-electric effects, etc., can also be used.

Despite of the implementation differences described above, the second embodiment operates in the same way as the first preferred embodiment.

Figure 12:
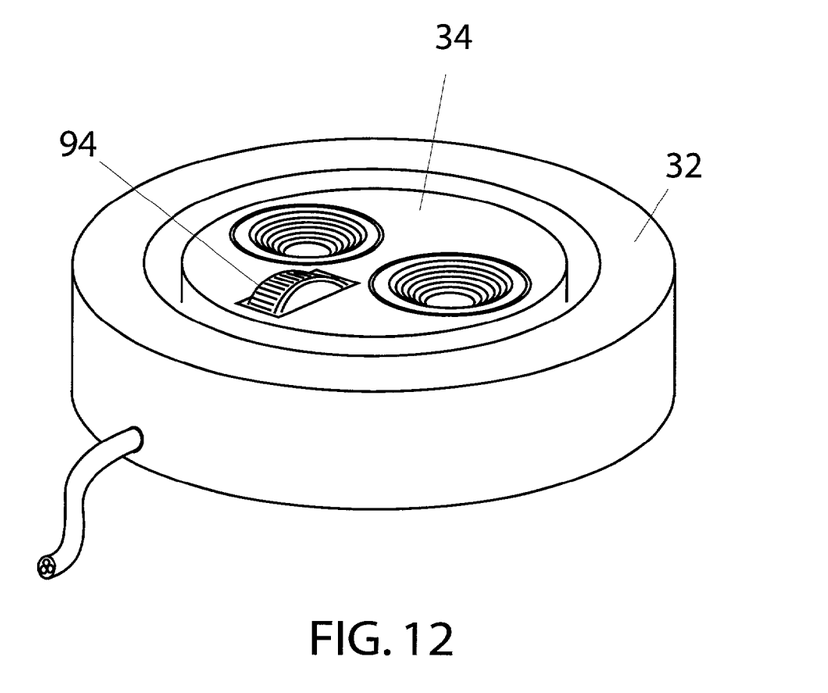
FIG. 12. shows an embodiment in which the body is integrated with a wheel and two buttons.
Figure 13:
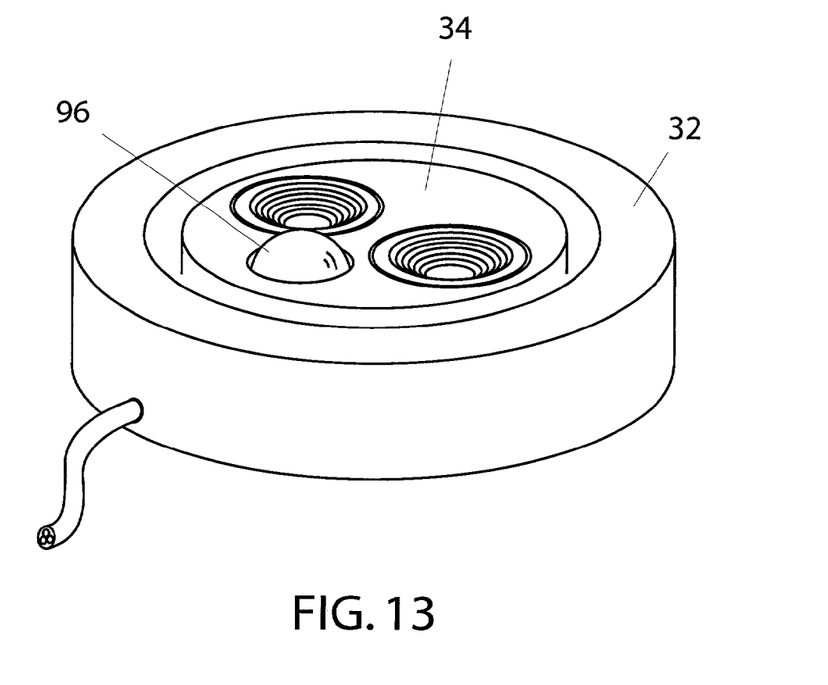
FIG. 13. shows an embodiment in which the body is integrated with a miniaturized trackball and two buttons.
Figure 14A:
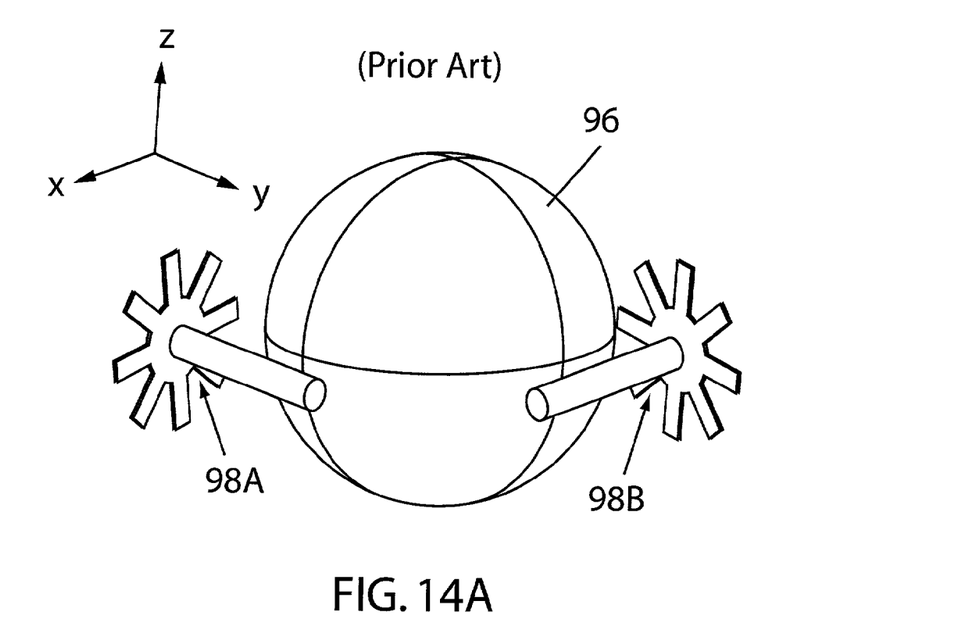
FIG. 14A shows two rotary encoders being used inside a conventional prior-art trackball.
Figure 14B:
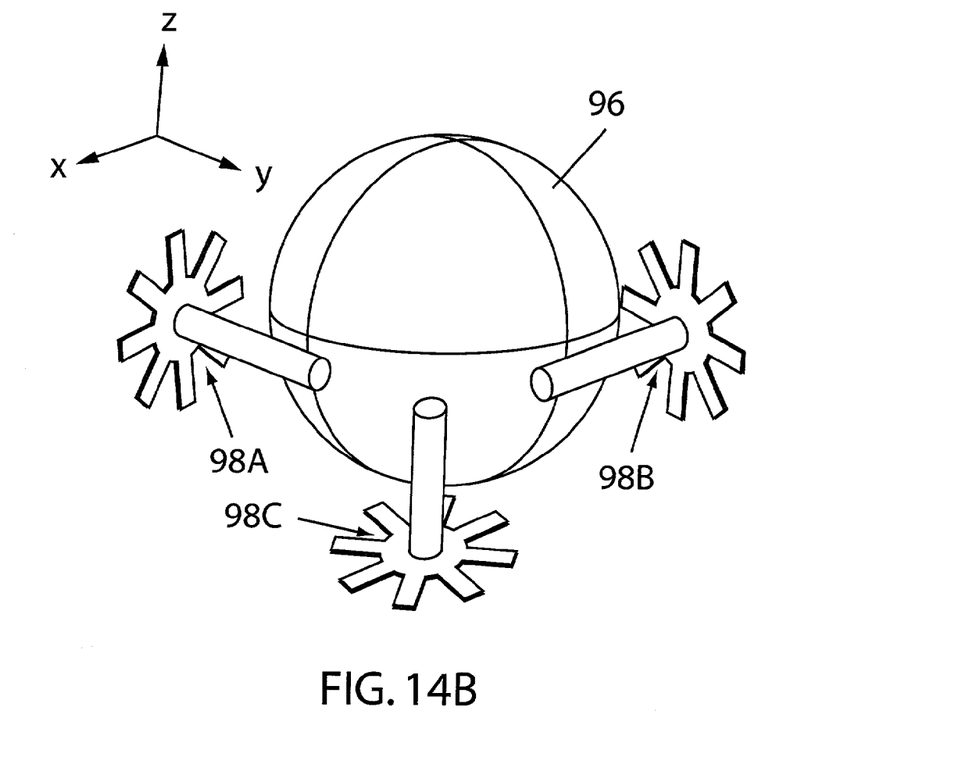
FIG. 14B shows an extended trackball capable of sensing the trackball's orientation position changes in three degrees of freedom.

FIGS. 12–14—Description of Other Embodiments

When positional control for only two DOF is required, the aforementioned embodiments can be simplified. For the first embodiment, the rheostat and associated shaft can be removed. For the second embodiment, only one tablet and one stylus ball are needed. These simplified devices will not respond to the z-axis input, but manufacturing cost and device complexity are reduced because there are fewer components in the device. One can also use off-the-shelf direction-detecting products, such as pointing sticks, to replace the tablets (of the second preferred embodiment) or the pressure-sensitive sensors (of the first preferred embodiment) for generating positional signals.

Note that while these simplified embodiments can only provide two DOF of positional control, they still offer significant advantages over conventional pointing devices. Compared to normal pointing sticks, the enlarged movable body is easier to acquire and provides rest support to the operating fingers. The body integrates buttons, such that no separate additional buttons are required. Compared to a normal mouse, the above embodiments require little space to operate. Due to their isometric operation, these embodiments do not require "clutching".

Compared to the previously discussed devices from the Healey patent application and the Ong patent, the finger-engaging elements allow the operating fingers to perform "point and click" operations simultaneously. The device can be made more compact since it needs accommodate fewer fingers.

Compared to the previously discussed Seffemick device, which can only simulate a single mouse button, the above embodiments permit the integration of multiple buttons in the movable body. Moreover, the body can be integrated with many other types of input elements, e.g., scrolling wheels, pressure sensors, tablets, miniaturized trackballs, miniaturized pointing sticks, etc.

FIG. 12 shows an embodiment with two buttons and an integrated scrolling wheel 94. The scrolling wheel is similar to those seen on commercial, well-known wheeled-mice products, such as the IntelliMouse(R) from Microsoft(TM). When using the device, an operator's index finger and ring finger engage two button caps 26, while a middle finger can scroll on the wheel. Signals produced by the wheel can be used to scroll a long document in a window.

FIG. 13 shows an embodiment with two buttons and an integrated trackball 96. The trackball is the same as a common trackball, except that it is miniaturized. Trackballs are well known to those skilled in the art. When using the device, an operator's index finger and ring finger engage the two button caps, while a middle finger can operate the trackball.

The last embodiment demonstrates a novel way of positioning a target over a maximum of six DOFs. That is, the integrated trackball is used to produce three additional positional signals. Like the first and the second embodiments, manipulating the body can control a target's translational movement along the X, Y, and Z axes. By using the trackball, one can now further control the target's orientation with respect to the X, Y, and Z axes.

FIG. 14A shows a conventional trackball, which normally uses only two rotary encoders 98. Each rotary encoder translates the rotations of ball 96 at one axis into one channel of positional control signals. A conventional trackball is thus limited to producing two channels of positional signals from the ball's rotations. FIG. 14B shows a third rotary encoder 98C added in order to sense the rotation of ball 96 about the z-axis. The trackball is now extended to produce a third channel of control signals from the ball's rotations. Using rotary encoders 98 to sense a ball's rotations (as shown in FIGS. 14A and 14B) are well known to those skilled in the art.

Also note that, in the embodiment of FIGS. 14A and 14B, rotations of the trackball are mapped to the rotations of a target. This compares to the use of a conventional trackball, where rotations of the trackball are mapped to translational movements of a cursor. Thus, the device will be more intuitive to operate.

Finally, in addition to integrating input elements into the movable body, it is also quite easy to integrate additional input elements into the base. For example, referring back to FIG. 5, buttons (not shown) can be integrated into base 32, placed under the thumb and the ring finger. Note that, in using devices from the Ong and Healey patent publications, the thumb and the ring finger are occupied with moving the body. In the disclosed invention, finger-engaging elements allow button-clicking fingers also to manipulate the body simultaneously. It thus frees the other fingers for additional input operations.

CONCLUSION

As will be evident from the above embodiments and discussion, my mouse has the following advantages:

It is isometric and requires only a small amount of space to operate. It can be used stand-alone for space-constrained situations. It is also suitable for integration into portable computers.

It allows additional input elements to be integrated, ranging from conventional on-off switch buttons and pressure-sensitive tablets to scrolling wheels, miniaturized trackballs, and pointing sticks.

It is of compact size and is operated using a minimum number of fingers of a hand.

It is capable of providing positional control signals over up to six degrees of freedom.

It is effective and has a high performance, and it performs both point and click functions simultaneously without switching fingers.

It has ergonomic features. It is easy to control, and provides proper feedback and rest support to an operator.

Finally, it is flexible in the use of body movement sensors and input elements and returning members. Most parts of my mouse can use off-the-shelf products or can be made from existing technologies known to the manufacturer. Thus it is potentially less expensive to manufacture.

While I have disclosed specific examples and embodiments of my mouse, many variations and ramifications are possible. For example, there can be only one button integrated in the body, or there can be many different types of input elements placed on both the body and the base, at different locations; the shape of the body can be oval or polygonal or irregular; the return members can be an elastic shaft or rubber bans or silicone fillings or components emitting magnetic forces; the size of the mouse can be bigger to offer greater comfort of control, or it can be smaller to be used in handheld devices; the material of making the mouse can be wood, plastic, rubber, fiber, glass, or mental; etc. It is therefore intended that the invention not be limited by the foregoing description, but only by the appended claims and their legal equivalents.

I claim:

1. An input apparatus, comprising:
   (a) a body having an rest position relative to a base,
   (b) a first means for moving of said body away from said rest position, wherein the movement of said body comprises a translational component and a rotational component,
   (c) a second means for guiding said movement of said body substantially in a predetermined plane,
   (d) a third means for producing separate input signals independently based on said translational component and said rotational component of said movement, and
   (e) a fourth means for returning said body back to said rest position, whereby said input apparatus has a low profile, and
   whereby said input apparatus can be operated without the need of a flat supporting surface.

2. The computer input apparatus of claim 1 further comprising:
   (f) an input element, wherein said input element is integrated with said body.

3. The computer input apparatus of claim 2 wherein said input element is selected from the group consisting of a button, a switch, a pressure-sensing component, a pointing stick, a scrolling wheel, and a trackball.

4. The computer input apparatus of claim 2 further comprises a finger-engaging structure, whereby said finger-engaging structure enables finger to move said body and to operate said input element simultaneously.

5. The computer input apparatus of claim 4 wherein said finger-engaging structure is a button cap.

6. The computer input apparatus of claim 1 wherein said first means comprises a non-slippery surface at the top of said body.

7. The computer input apparatus of claim 1 wherein said second means comprises a planer surface contact between said body and said base.

8. The computer input apparatus of claim 1 wherein said third means comprises a sensor for sensing said movement and a circuit logic producing said control signals.

9. The computer input apparatus of claim 8 wherein said sensor comprises a plurality of pressure-sensitive resistors.

10. The computer input apparatus of claim 1 wherein said fourth means comprises an elastic linkage connecting said body to said base.

11. A method for generating control signals to a target, comprising steps of:
    (a) providing a movable body having a rest position relative to a base,
    (b) providing an input element integrated with said body,
    (c) providing a finger-engaging means enabling using finger to move said body away from said rest position and to operate on said input element simultaneously,
    (d) generating positional control signals relate to the movement of said body, said movement of said body comprises a rotational component and a translational component, said rotational component is independent to said translational component,
    (e) generating non-positional control signals relate to the operation of said input element, and
    (f) providing a returning means to return said body back to said rest position,
    whereby said method provides both positional and non-positional control to said target with fingertips, and
    whereby said method avoids the need of a flat supporting surface.

12. The method of claim 11 further comprising a step of:
    (g) restricting said movement of said body substantially in a predetermined plane.

13. The method of claim 11 wherein said body comprises a major top surface.

14. The method of claim 13 wherein said body is a disc.

15. The method of claim 11 wherein said input element is a button.

16. The method of claim 11 wherein said finger-engaging means is a button cap.

17. The method of claim 11 wherein said returning means comprises an elastic linkage connecting said body to said base.

18. A method for producing six degrees-of-freedom input signals to a target, comprising steps of:
    a) providing a first element movable substantially in a predetermined plane wherein the movement of said body has a translational component and a rotational component,
    b) sensing said movement of said first element,
    c) producing a first and a second signals relate to said translational component of said movement of said first element,
    d) producing a third signal relate to said rotational component of said movement of said first element,
    e) providing a second element rotatable around three axes, wherein said axes are orthogonal to each other,
    f) sensing the rotations of said second element around said three axes,
    g) producing a fourth, a fifth, and a sixth signals based on said rotations around said three axes.

19. The method for producing six degrees-of-freedom input signals to a target in claim 18 further comprising a step of:
    h) integrating said fir st element with said second element.

20. The method for producing six degrees-of freedom input signals to a target in claim 18 wherein said first element is a disc.

21. The method for producing six degrees-of freedom input signals to a target in claim 18 wherein said second element is a ball.

* * * * *